United States Patent
Paz-Pujalt et al.

[11] Patent Number: 6,121,991
[45] Date of Patent: Sep. 19, 2000

[54] FORMING AUTHENTICATED IMAGES IN A RECEIVER

[75] Inventors: Gustavo R. Paz-Pujalt, Rochester; David L. Patton, Webster; John R. Fredlund, Rochester, all of N.Y.

[73] Assignee: Eastman Kodak Company, Rochester, N.Y.

[21] Appl. No.: 09/103,019

[22] Filed: Jun. 23, 1998

[51] Int. Cl.[7] .................................................. B41J 2/325
[52] U.S. Cl. .......................... 347/232; 347/176; 347/187; 430/200
[58] Field of Search .................................... 347/172, 173, 347/174, 187, 193, 203, 232, 176; 399/194; 503/227, 201, 207; 283/88; 428/195; 430/200

[56] References Cited

U.S. PATENT DOCUMENTS

| | | | |
|---|---|---|---|
| Re. 33,260 | 7/1990 | Stephenson | 347/178 |
| 4,387,153 | 6/1983 | Bonneron | 430/200 |
| 4,507,349 | 3/1985 | Fromson et al. | 428/195 |
| 4,541,830 | 9/1985 | Hotta et al. | 8/471 |
| 5,332,713 | 7/1994 | Oldfield et al. | 503/227 |
| 5,387,013 | 2/1995 | Yamauchi et al. | 283/86 |
| 5,387,573 | 2/1995 | Oldfield et al. | 503/227 |
| 5,489,566 | 2/1996 | Dombrowski et al. | 503/207 |
| 5,752,152 | 5/1998 | Gasper et al. | 399/366 |
| 5,822,660 | 10/1998 | Wen | 399/194 |
| 5,919,730 | 7/1999 | Gasper et al. | 503/201 |

FOREIGN PATENT DOCUMENTS

| | | |
|---|---|---|
| 721849 | 7/1996 | European Pat. Off. |
| 800929 | 10/1997 | European Pat. Off. |
| WO 93/22146 | 11/1993 | WIPO |

Primary Examiner—N. Le
Assistant Examiner—Hai C. Pham
Attorney, Agent, or Firm—Raymond L. Owens

[57] ABSTRACT

A method of forming authenticated images on image areas of a receiver to form a series of viewable images such as postal stamps including moving a colorant donor element having a plurality of transferable colorants into transferable relationship with the receiver, the colorant donor element includes a representation of an image and marks which authenticate the image having colorant over such representation and marks; and transferring colorants onto the receiver in accordance with the representation and marks in the colorant donor element to form authenticated images in the receiver.

7 Claims, 4 Drawing Sheets

FORMING AUTHENTICATED IMAGES IN A RECEIVER

FIELD OF THE INVENTION

The present invention relates forming authenticated images on image areas of a receiver such as a series of postal stamps.

BACKGROUND OF THE INVENTION

Heretofore images of high quality have been produced by thermal printers. In a typical thermal printer an image is formed in three passes. First a dye donor having color such as yellow is placed in dye transfer relationship with a receiver and then the dye donor is heated in a pattern corresponding to the yellow portion of an image to be completed. Thereafter, cyan and magenta portions of the image are formed in a similar fashion. The completed color image on the receiver is continuous tone and in many cases can rival photographic quality.

In one type of thermal printer which prints colored images, a donor contains a repeating series of spaced frames of different colored heat transferable dyes. The donor is disposed between a receiver, such as coated paper, and a print head formed of, for example, a plurality of individual heating resistors. When a particular heating resistor is energized, it produces heat and causes dye from the donor to transfer to the receiver. The density or darkness of the printed color dye is a function of the energy delivered from the heating element to the donor.

Thermal dye transfer printers offer the advantage of true "continuous tone" dye density transfer. This result is obtained by varying the energy applied to each heating element, yielding a variable dye density image pixel in the receiver.

Thermally printed images are used in a number of different applications. In one of those applications, so-called "sticker prints" are made on a receiver and arranged so that they can be peeled off and individually pasted onto another surface. However, these stickers are not used in situations which require that they be "authentic". By use of the term "authenticated" it is meant that the image can indicate to a viewer or a reader with a high degree of certainty that the image has not been counterfeited.

SUMMARY OF THE INVENTION

It is an object of the present invention to produce an authenticated image which can be used in applications such as postage stamps.

This object is achieved in a method of forming authenticated images on image areas of a receiver to form a series of viewable images such as postal stamps comprising the steps of:

(a) moving a colorant donor element having a plurality of transferable colorants into transferable relationship with the receiver, the colorant donor element includes a representation of an image and marks which authenticate the image having colorant over such representation and marks; and (b) transferring colorants onto the receiver in accordance with the representation and marks in the colorant donor element to form authenticated images in the receiver.

An advantage of the present invention is that an image is authenticated by marks transferred to the receiver.

An advantage of the present invention is that images can rarely be produced which are authentic and which prevent counterfeiting, misuse or fraud.

A feature of the present invention is that authenticating marks can be formed on a receiver as part of the printing process. This authenticating information can be in the form of a bar code, an official seal, alphanumeric data or encoded digitized information.

Another feature of the present invention is that it facilitates the design of images to be authenticated such as postage stamps.

DETAILED DESCRIPTION OF THE INVENTION

Figure 1:
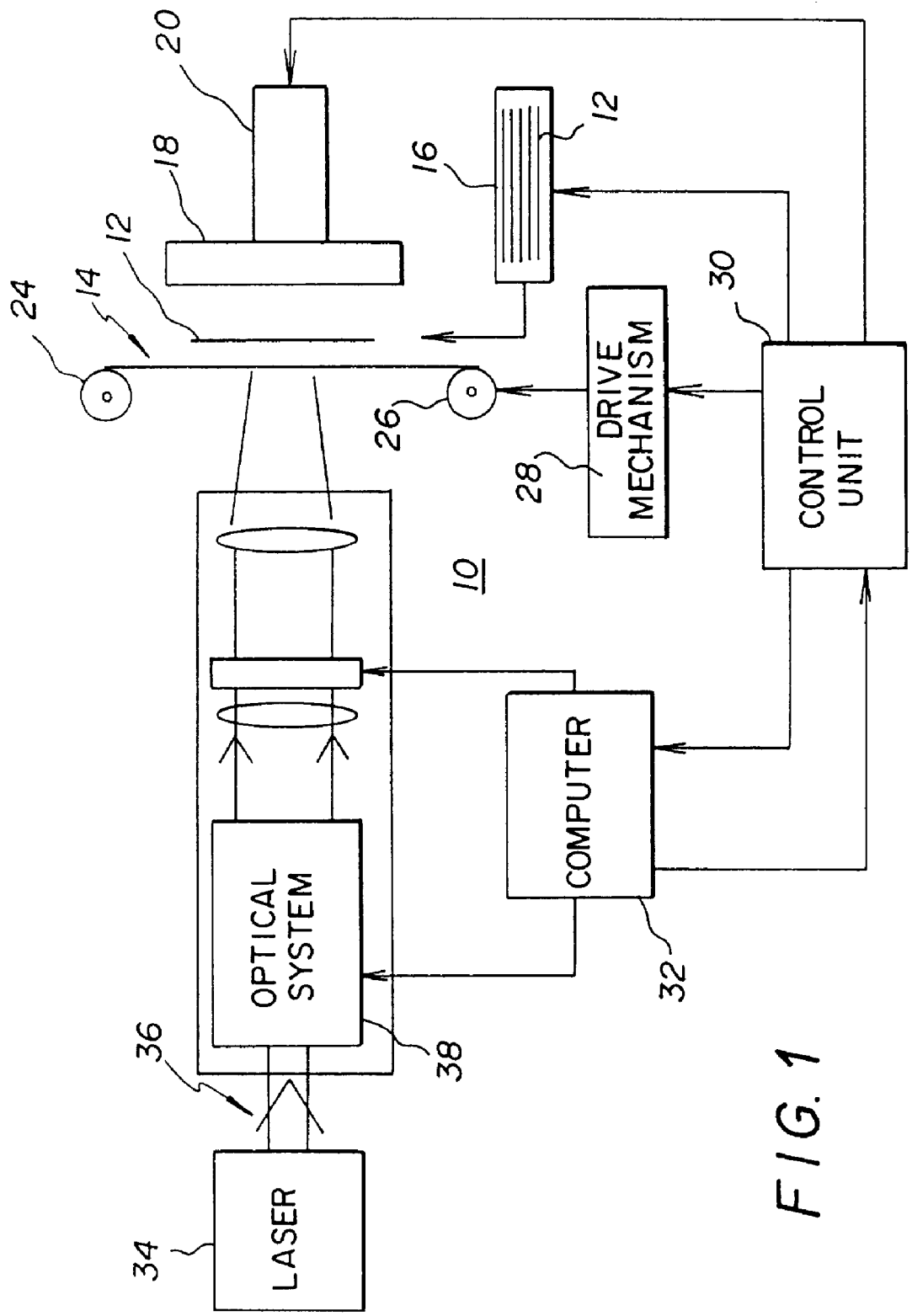
FIG. 1 is a schematic block diagram of a thermal printing apparatus which makes authenticated images on a receiver in accordance with the present invention.

Referring to FIG. 1 shows a thermal printer apparatus 10 which employs a receiver 12 and a colorant donor element 14 in the form of a web. Receiver 12, in the form of a sheet is serially fed from a tray 16 to a print position by a conventional sheet feeding mechanism, not shown. As used herein the term "colorant" can include dyes, pigments or inks which can be transferred from the colorant donor element 14 to the receiver 12.

Figure 2:
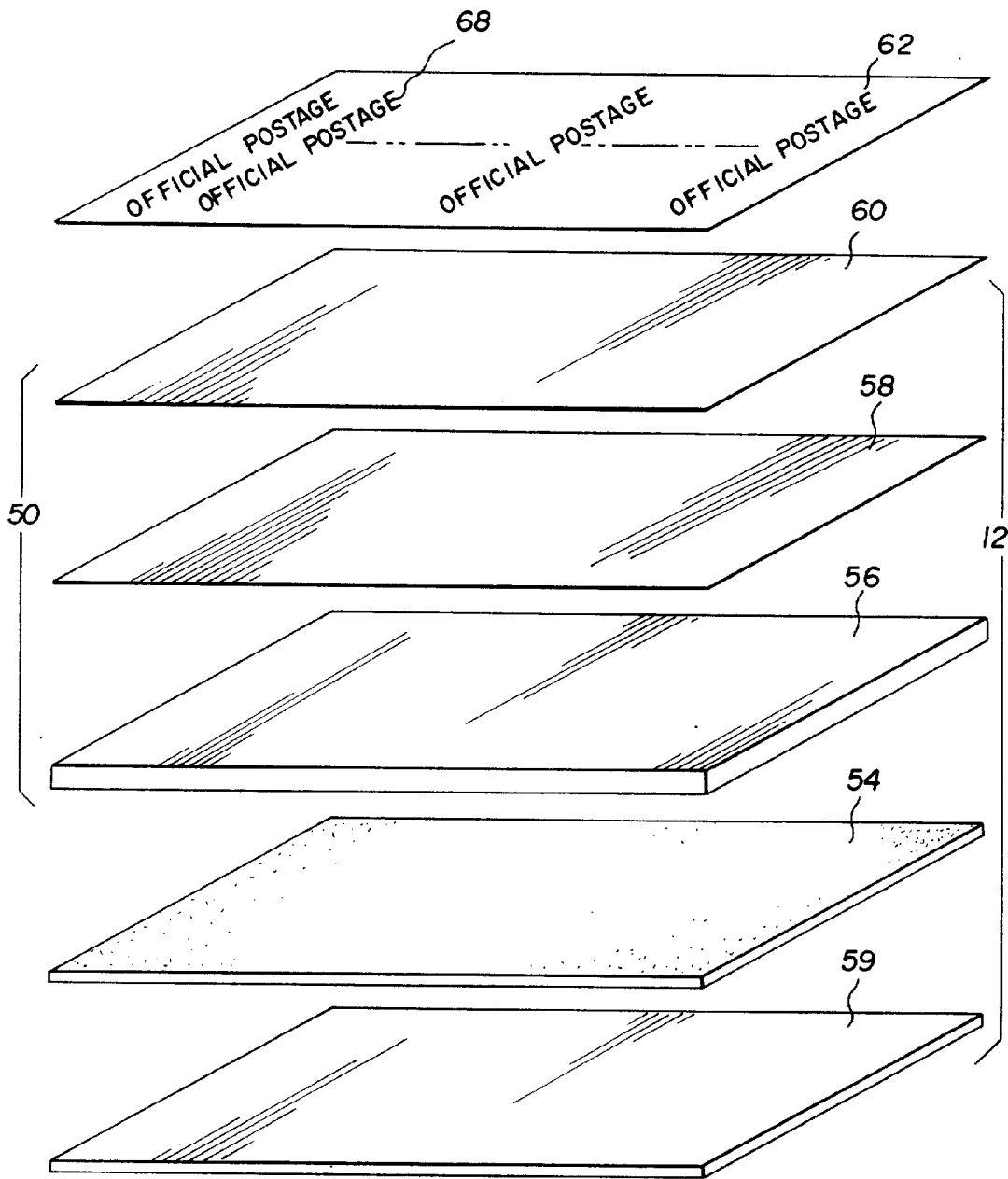
FIG. 2 is an exploded cross-sectional view showing various layers in a receiver and protective layer which has been transferred from a clear coat patch of the colorant donor element to the receiver.

Now referring to FIG. 2, receiver 12 includes an image receiving structure 50 which is formed on a support 56. The support 56 can be formed of paper or plastic such as polyethylene terephthalate or polyethylene napthhlate. Alternatively, it can be in the form of a web. In this embodiment an adhesive layer 54 provided on the back surface of the support 56. A peelable protective release layer 59 is provided over the adhesive layer 54 until it is to be used for securing the image receiving structure 50 to a surface. This type of construction is particularly suitable when a series of peel apart authentic images 70 (see FIG. 4) are used, e.g. on postal stamps. Now returning to FIG. 2, the image receiving structure 50 includes in sequence three layers, the support 56, a barrier layer 58 and the colorant receiving layer 60. After authenticated images are formed on the colorant receiving layer 60, a protective layer 62 which will be described later is then formed on the colorant receiving layer 60. Referring now to FIG. 1, in operation, a platen 18 is moved into print position by an actuator 20 pressing the receiver 12 against the colorant donor element 14. Actuators are well known in the field and can be provided by a mechanical linkage, solenoid, and small piston arrangement or the like. Now referring to FIG. 2, the colorant donor element 14 includes a series of colorant patches 64a, 64b and 64c. These colorant patches 64a, 64b and 64c can be yellow, cyan and magenta and they are sequentially moved into image transferring relationship with the colorant donor element 14. The result of this process are authenticated images formed on the receiver 12.

Now referring to FIG. 1, the colorant donor element 14 is driven along a path from a supply roller 24 onto a take-up roller 26 by a drive mechanism 28 coupled to the take-up roller 26. The drive mechanism 28 includes a stepper motor which incrementally advances and stops the colorant donor element 14 relative to the receiver 12.

A control unit 30 having a microcomputer converts digital signals corresponding to the desired image from a computer 32 to analog signals and sends them as appropriate to the optical system 38 which modulates the laser beam produced by a laser light source 34 and focuses the laser light onto the colorant donor element 14. The laser light source 34 illuminates the colorant donor element 14 and heats such colorant donor element 14 to cause the transfer of colorant to the colorant receiving layer 60 of the image receiving structure 50. This process is repeated until an authenticated image is formed on each of the image receiving structures 50. Alternatively, a plurality of dye donor resistive elements (not shown) can be in contact with the colorant donor element 14 and can be used to form the images 70. When a dye donor resistive elements is energized it is heated which causes dye to transfer from the colorant donor element 14 to the receiver 12 in a pattern to provide the colored image. For a more complete description of this type of thermal printing apparatus reference is made to commonly assigned U.S. Pat. No. Re 33,260. Of course the process has to be repeated using the yellow, cyan and magenta patches to complete the colored image 70. In accordance with the present invention an authenticated image can have one or more colors.

Figure 3:
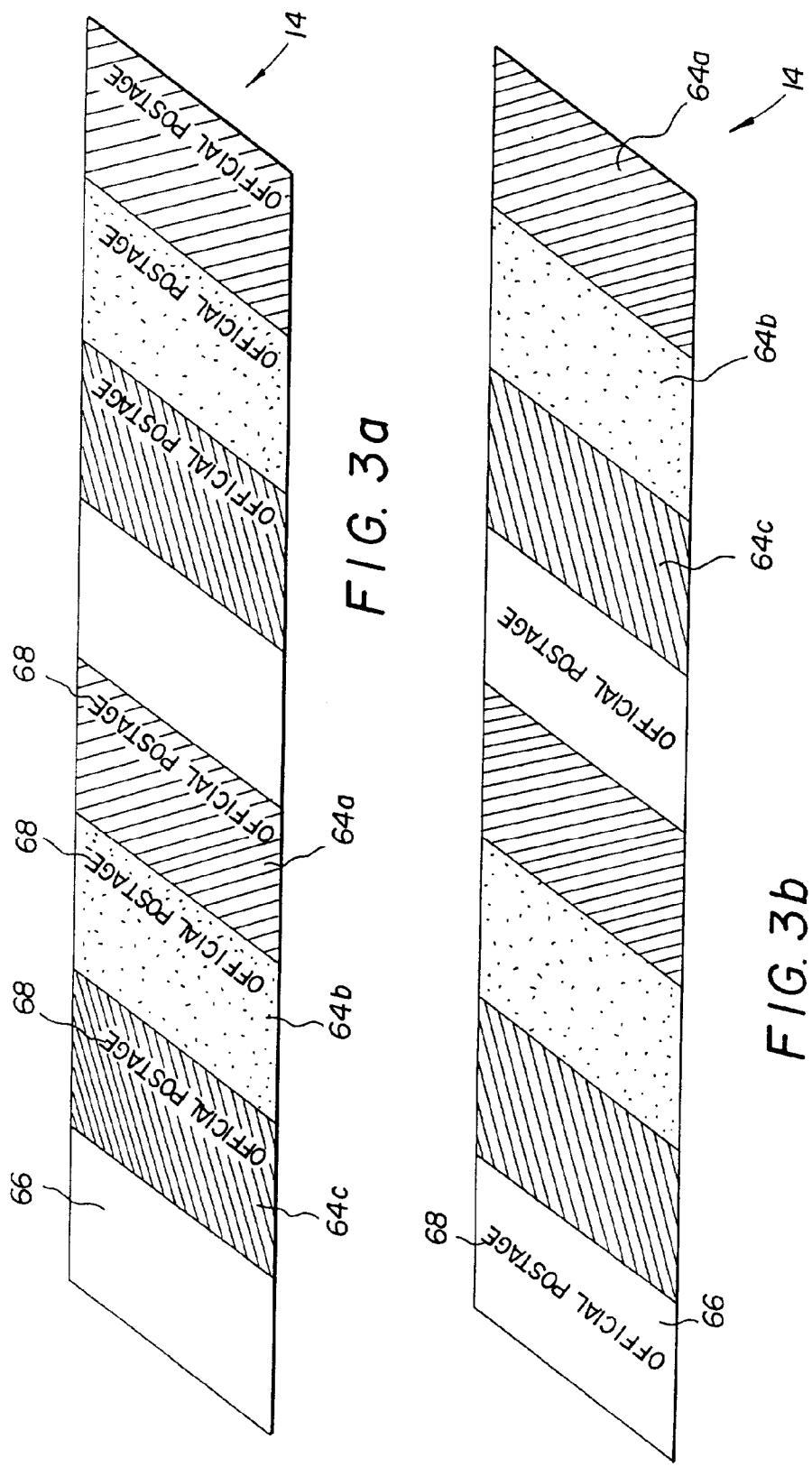
FIGS. 3a and 3b show a strip of a typical colorant donor element in web format which can be used by the apparatus shown in FIG. 1.

FIGS. 3a and 3b show a typical section of a strip of a colorant donor element 14 which can be used in the thermal printer apparatus 10 of FIG. 1. As shown, there are a series of repeating colorant patches cyan 64a, yellow 64b, and magenta 64c. When heat is applied to the dye in each colorant patch 64a–c, it is transferred to the receiver 12 in a manner well-known in the art. Each series of colorant patches 64a–c is followed by a protective coating patch 66 containing the marks 68 or information.

It is desirable that the marks 68 be highly accurate so that they may not be counterfeited. For that purpose the marks 68 are created in the protective coating patch 66 containing them by a gravure process. The marks 68 are formed with a high level of detail so that they are difficult to duplicate and permit colorant on the marks 68 to form images 70. The marks 68 cause an image 70 to be formed in the receiver 12. The marks 68 have a high level of detail so that when an image 70 is formed it will indicate to a viewer or reader of the receiver 12 that the images are authentic. The gravure process is capable of creating marks 68 of very high resolution, well beyond the capabilities of most common printers. The gravure process is an intaglio process. It uses a depressed or sunken surface for the marks 68. The colorant patches 64a, 64b, and 64c consist of cells or welds etched into a copper cylinder and the unetched surface of the cylinder represents the non-printing areas. The cylinder rotates in a bath of ink. Gravure printing is considered excellent for printing highly detailed marks 68 or pictures. The high expense in making cylinders usually limits gravure printing for long runs. Different types of inks may be used for depositing the marks 68 by the gravure process as noted later.

As is well known in the art, the colorant donor element 14 can be formed in a gravure process. In accordance with the present invention, during the gravure process marks 68 are formed in protective coating patch 66. Alternatively, marks 68 can be formed in one or more of the colorant patches 64a, 64b and 64c. These marks 68 will embed official information onto an image when colorant is transferred to the receiver 12. These marks 68 provide authenticating information. This authenticating information can be in the form of a bar code, an official seal, alphanumeric data or encoded digitized information. Therefore, during the image forming process the image 70 is provided and also marks 68 are formed on the receiver 12 which permit the image 70 to be authenticated.

Alternatively as shown in FIG. 2, the protective layer 62 can be formed on the colorant receiving layer 60 after an image 70 has been formed to such colorant receiving layer 60. Marks 68 which authenticate the image 70 can be preformed within the protective layer 62 by a number of well known processes including the thermal printing processes described above. The image 70 can be applied to the receiver 12 using the fourth or fifth pass of a thermal printing process. The fourth or fifth pass of the printing process is used to form a transferable protective layer 62 of the receiver 12. For a more complete description of this process, reference is made to commonly assigned U.S. Pat. No. 5,387,573 and U.S. Pat. No. 5,332,713 which are incorporated herein by reference.

In yet another embodiment of this invention marks authenticating an image can reside in the memory of the computer 32 shown in FIG. 1. It will be understood that these marks representing images 70 are stored in a digital format in firmware, disks or in any other suitable storage device. In this particular embodiment, the computer 32 causes colorants from the colorant patches 64a, 64b and 64c to transfer to the image receiving structure 50 in accordance with the stored digital format (image and marks). The firmware can be part of the memory unit of the computer 32. Thereafter the laser beam light source 34 and optical system 38 heat the transferred colorants in accordance with the image 70 and the marks 68 stored in memory.

Colorants in the colorant donor element 14 are transferred to the image receiving layer 60 of the receiver 12. A sublimable dye is a suitable colorant that can be effectively transferred to receivers in accordance with the present invention. Examples of sublimable dyes include anthrauinone dyes, e.g. Sumikalon Violet RS™ (product of Sumitomo Chemical Co., Ltd.), Dianix Fast Violet 3R-FS™ (product of Mitsubishi Chemical Industries, Ltd.), and Kayalon Polyol Brilliant Blue N-BGM™ and KST Black 146™ (products of Nippon Kayaku Co., Ltd.), azo dyes such as Kayalon Polyol Brilliant Blue BM, Kayalon Polyol Dark blue 2BM™, and KST Black KR™ (products of Nippon Kayaku Co., Ltd.), Sumickaron Diazo Black 5G (product of Sumitomo Chemical Co. Ltd.), and Mkitazol Black 5GH™ (product of Mitsui Toatsu Chemicals, Inc.); direct dyes such as Direct Dark Green B™ (product of Mitsubishi Chemical Industries, Ltd.) and Direct Brown M™ and Direct Fast Black D™ (products of Nippon Kayaku Co., Ltd.); acid dyes such as Kayanol Milling Cyanine 5R™ (product of Nippon Kayaku Co., Ltd.); basic dyes such as Sumicacryl Blue 6G™ (product of Sumitomo Chemical Co., Ltd.), and Aizen Malachite Green™ (product of Hodogaya Chemical Co., Ltd.); or any of the dyes disclosed in U.S. Pat. No. 4,541, 830. The above dyes may be employed singly to obtain a monochrome. The dyes may be used at a coverage of from about 0.05 to about 1 g/m2 and are preferably hydrophobic.

When the colorants are inks or dyes, they can be of the type that fluoresce and are not necessarily visible to the unaided eye as described in commonly-assigned U.S. Pat. No. 5,752,152 and U.S. patent application Ser. No. 08/598, 785, filed Feb. 8, 1998, entitled "Copy Restrictive Documents" by Sutton et al; Ser. No. 08/835,976, filed Apr. 11, 1997, entitled "Copy Restrictive Color Reversal Documents" by J. Gasper; Ser. No. 08/837,931, filed Apr. 11, 1997, entitled "Color Restrictive System for Color-Reversal Documents" by J. Gasper; Ser. No. 08/873,959, filed Jun. 21, 1997, entitled "Copy Restrictive Color-Negative Photographic Print Media", by J. Gasper and Ser. No. 08/846,387, filed Apr. 30, 1998, entitled "Apparatus for Creating Copy Restrictive Media" by J. Gasper, the teachings of which are incorporated by reference. These inks or dyes can reside on a patch of a colorant donor element 14 and be applied during additional passes.

Figure 4:
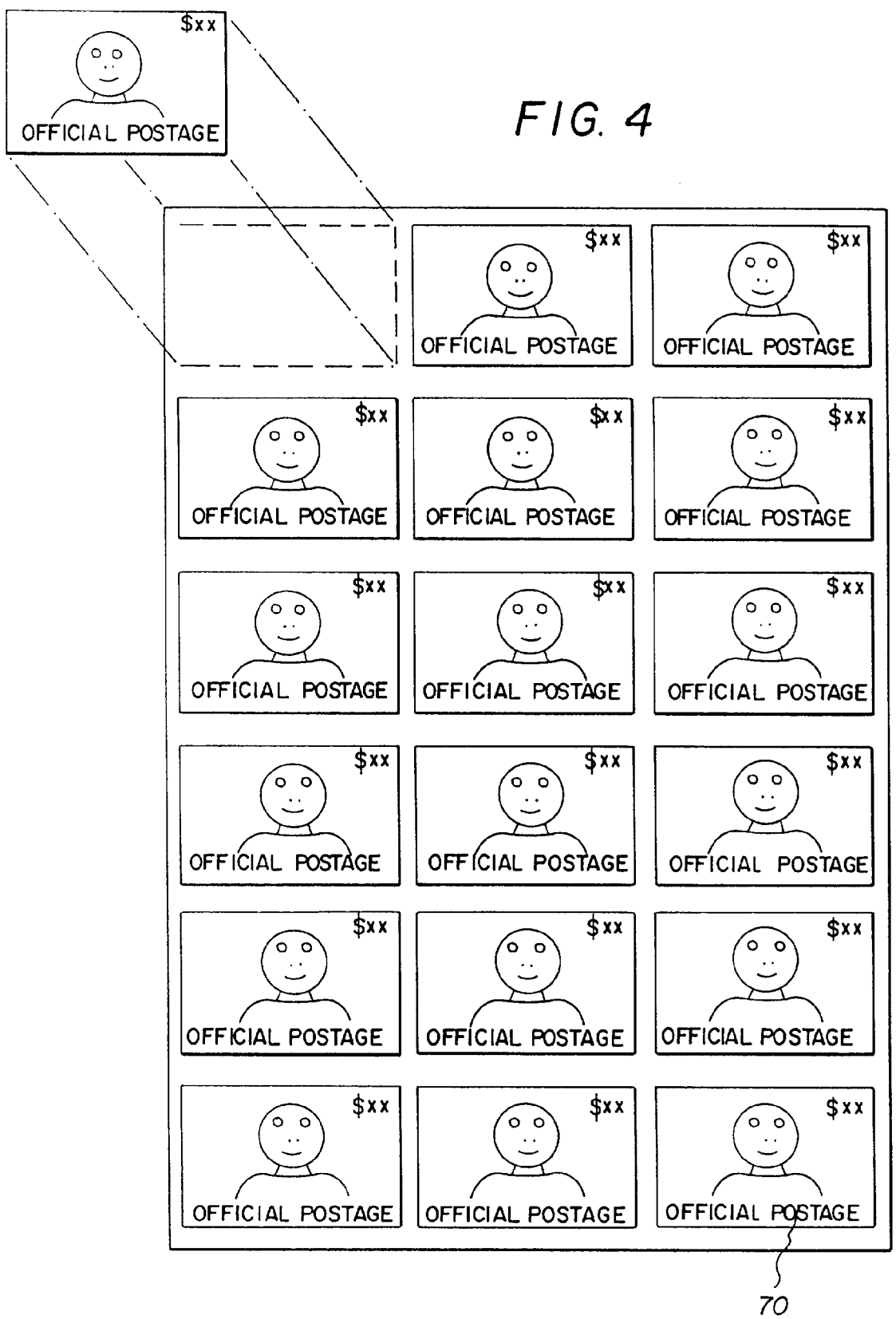
FIG. 4 shows a series of authentic images which are formed on the receiver of FIG. 2.

Turning now to FIG. 4 which shows the output of the printing process which is a series of viewable images 70 such as postal stamps. The printer apparatus 10 of FIG. 1 can produce the series of images 70 in the receiver 12 using one or more passes. When multiple colors are to be applied then, for example, if cyan, magenta, yellow and black are the colorant patches then there has to be four passes by the receiver 12. For another example, if cyan, magenta and yellow series of images are formed, another pass can take place which causes a protective layer 62 to be formed on the receiver 12. A series of marks 68 were formed in the protective coating patch 66 which are images 70 (a series of images formed on the receiver 12). The images 70 are shown in FIGS. 2, 3a, 3b and 4. Turning briefly to FIGS. 3a and 3b, where there are three colorant patches cyan 64a, yellow 64b and magenta 64c and a protective layer 62. Marks 68 are provided in the protective coating patch 66 and which have marks 68 applied over them. The images 70 when formed with their adhesive backing 54 of FIG. 2 are easily peeled free of the paper release layer 59. Such a structure is suitable for postal stamps.

While the invention has been described with reference to the embodiment disclosed, it is not confined to the details set forth, but is intended to cover such modifications or changes as may come within the scope of the following claims.

PARTS LIST

10 printer apparatus
12 receiver
14 colorant donor element
16 tray
18 platen
20 actuator
24 supply roller
26 take-up roller
28 drive mechanism
30 control unit
32 computer
34 laser light source
38 optical system
50 image receiving structure
54 adhesive layer
56 support
58 barrier layer
59 protective layer
60 colorant receiving layer
62 protective layer
64a colorant patch
64b colorant patch
64c colorant patch
66 protective coating patch
68 marks
70 images

What is claimed is:

1. A method of forming authenticated images on image areas of a receiver to form a series of viewable images such as postal stamps comprising the steps of:
   (a) moving a colorant donor element having a plurality of transferable colorants into transferable relationship with the receiver, the colorant donor element includes a representation of an image and marks which authenticate the image having colorant over such representation and marks; and
   (b) transferring colorants onto the receiver in accordance with the representation of the image and marks in the colorant donor element to form authenticated images in the receiver.

2. The method of claim 1 wherein the marks are covered with a colorant of at least one color.

3. The method of claim 1 wherein the colorants that form the authenticated image is a dye and the dye is transferred in response to heat applied to the donor element by a thermal printer.

4. The method of claim 1 wherein the colorants that form the authenticated image include cyan, magenta and yellow which are sequentially transferred to form continuous tone color images.

5. The method of claim 4 wherein the marks are preformed on the colorant donor element and is transferable to the receiver.

6. The method of claim 5 wherein the marks are formed by a gravure process so that the marks provide a high level of detail which is difficult to duplicate.

7. The method according to claim 1 wherein the marks are invisible to the unaided eye.

* * * * *